United States Patent
de Boer et al.

(10) Patent No.: US 12,129,116 B2
(45) Date of Patent: Oct. 29, 2024

(54) FILLING STATION AND METHOD FOR FILLING A FEEDER UNIT WITH DISCRETE MEDICAMENTS

(71) Applicant: VMI Holland B.V., Epe (NL)

(72) Inventors: Anthonius Maria Hendrina de Boer, Epe (NL); Cornelis Jan Jochemsen, Epe (NL)

(73) Assignee: VMI Holland B.V., Epe (NL)

( * ) Notice: Subject to any disclaimer, the term of this patent is extended or adjusted under 35 U.S.C. 154(b) by 315 days.

(21) Appl. No.: 17/408,529

(22) Filed: Aug. 23, 2021

(65) Prior Publication Data

US 2023/0057693 A1   Feb. 23, 2023

(51) Int. Cl.
| | | |
|---|---|---|
| B65G 1/10 | (2006.01) | |
| A61J 7/00 | (2006.01) | |
| B65B 5/10 | (2006.01) | |
| G01G 15/00 | (2006.01) | |

(52) U.S. Cl.
CPC .............. *B65G 1/10* (2013.01); *A61J 7/0076* (2013.01); *B65B 5/103* (2013.01); *G01G 15/006* (2013.01)

(58) Field of Classification Search
CPC .... B65B 5/103; G07F 17/0092; A61J 7/0076; B67D 1/0894
USPC ...................................... 141/18; 222/164–166
See application file for complete search history.

(56) References Cited

U.S. PATENT DOCUMENTS

| | | | | |
|---|---|---|---|---|
| 81,814 | A * | 9/1868 | Nuellens | F25D 31/007 215/396 |
| 2,457,220 | A * | 12/1948 | Fowler | A61J 7/02 222/164 |
| 5,086,817 | A * | 2/1992 | Murphy | B67D 1/1272 141/369 |
| 6,554,157 | B2 | 4/2003 | Geltser et al. | |
| 7,711,449 | B2 | 5/2010 | Abdulhay et al. | |
| 9,198,834 | B2 * | 12/2015 | Solvell | A61J 7/0076 |
| 2008/0173370 | A1 * | 7/2008 | Golding | C12M 23/50 141/1 |
| 2012/0132317 | A1 * | 5/2012 | Luchinger | G01G 13/02 222/164 |
| 2012/0139201 | A1 * | 6/2012 | Chauza | B62B 1/16 222/164 |
| 2023/0219802 | A1 * | 7/2023 | Neubauer | B67D 1/0888 141/311 R |

FOREIGN PATENT DOCUMENTS

WO   2021/090314 A1   5/2021

* cited by examiner

*Primary Examiner* — Timothy P. Kelly
(74) *Attorney, Agent, or Firm* — N.V. Nederlandsch Octrooibureau

(57) ABSTRACT

A filling station for filling a feeder unit with discrete medicaments includes a base and a holder that is positionable in one or more inclined orientations relative to said base for holding the feeder unit in said one or more inclined orientations. A method for filling a feeder unit with discrete medicaments includes the step of filling the feeder unit with the discrete medicaments when the feeder unit is held by the holder in one of the one or more inclined orientations.

29 Claims, 8 Drawing Sheets

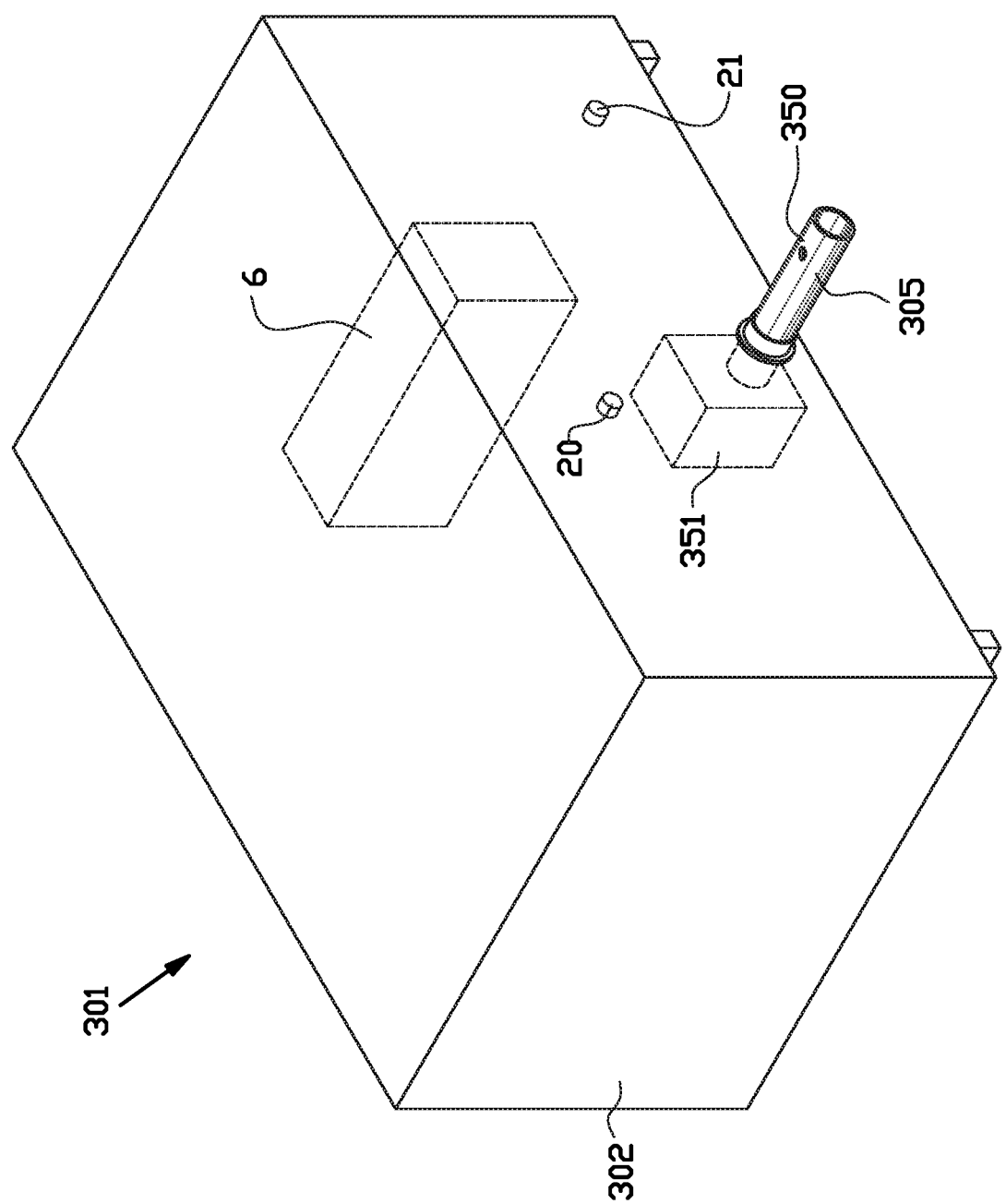

FILLING STATION AND METHOD FOR FILLING A FEEDER UNIT WITH DISCRETE MEDICAMENTS

BACKGROUND

The invention relates to a filling station and a method for filling a feeder unit with discrete medicaments.

U.S. Pat. No. 10,173,830 B2 discloses a medication dispensing container, also known as a 'canister', for use in an automated dispensing device. The medication dispensing container comprises a supply chamber for holding medications and a dispensing mechanism below said supply chamber for selectively dispensing an amount of the medication from the supply chamber into hopper position below said medication dispensing container.

The medication dispensing container is provided with a lid or cover on top. The cover is connected to the supply chamber by means of a hinge. Thus the cover can swing around the hinge for opening the top of the medication dispensing container to gain access to a filling opening at the top of the medication dispensing container, for refilling of the supply chamber. During the refilling, the medication dispensing container is held in an upright position.

SUMMARY OF THE INVENTION

A disadvantage of the known medication dispensing container is that initially during the refilling, when the supply chamber is still empty or relatively empty, the discrete medicaments that are being dropped into the supply chamber free fall over a relatively long drop path until they bounce off the dispensing mechanism at the bottom of the supply chamber. The impact may damage the discrete medicaments. When the damage is detected during the subsequent dispensing, the dispensing operation has to be interrupted and the damaged discrete medicaments have to be discarded or the contents of the pouch needs to be corrected manually. When the damage is not detected, the damaged discrete medicaments may lead to a wrong dosage or misunderstanding by the patient.

It is an object of the present invention to provide a filling station and a method for filling a feeder unit with discrete medicaments, wherein the risk of damage to the discrete medicaments during refilling can be minimized or reduced.

According to a first aspect, a filling station is provided for filling a feeder unit with discrete medicaments, wherein the filling station comprises a base and a holder for holding the feeder unit relative to the base, wherein the holder is positionable in one or more inclined orientations relative to said base.

The term 'inclined orientation' is to be interpreted as an orientation or position in which the holder is arranged at a slope or an oblique angle relative to the base, for the purpose of holding the feeder unit in the same or a similar orientation. The holder has a clear orientation, for example its longitudinal direction or the direction in which the feeder unit is supported on the holder or received on or in the holder. When the base is arranged in a level orientation, for example on a horizontal working surface such as a table, this means that the holder is arranged at a slope or an oblique angle to the horizontal and vertical planes.

In the inclined orientation of the holder, the discrete medicaments can be loaded into the supply chamber of the feeder unit while said supply chamber is positioned at an angle to the vertical direction. In particular, the discrete medicaments can be loaded in such a way that they can be deflected via or slide over one of the inclined circumferential surfaces of the supply chamber towards the bottom end of said supply chamber, instead of falling directly onto said bottom end. The risk of damage to the discrete medicaments can thus be minimized or reduced. Moreover, the filling station can autonomously hold the feeder unit in the inclined orientation, so that the operator has both hands free to perform the filling.

In one embodiment at least one of the one or more inclined orientations is at an inclination angle of at least forty-five degrees to a vertical plane. At such an inclination angle, the discrete medicaments are likely to fall onto one of the inclined circumferential surfaces of the supply chamber first, before reaching the bottom end thereof.

In another embodiment the filling station comprises a swivel mechanism for swiveling the holder relative to the base between an upright orientation and the one or more inclined orientations. When there is only one inclined orientation, the filling station can function without a swivel mechanism. However, it may be convenient to remove the feeder unit from the filling station in an orientation different from one of the inclined orientations, for example to prevent that the discrete medicaments fall out during the removal and/or to allow more convenient access to the feeder unit for other operations, such as opening or closing of the cover or weighing of the feeder unit. The swivel mechanism can facilitate switching between inclined positions or movement from and back into the upright orientation.

In a further embodiment the upright orientation is parallel to or within an offset angle of less than five degrees from a vertical plane. Hence, the feeder unit can be held by the holder in an upright or substantially upright orientation.

In a further embodiment the swivel mechanism defines a swivel axis, wherein the holder is swivable relative to the base about said swivel axis. Swiveling about a swivel axis can simplify the swivel mechanism, compared to a swivel mechanism that generates a more complex movement, such as a linkage.

In a further embodiment the swivel axis extends parallel to a horizontal plane. The swiveling can thus be limited to a motion in a vertical swivel plane, perpendicular to said swivel axis.

In a further embodiment the holder has a center of gravity that is located at one side of the swivel axis in a lateral direction perpendicular to said swivel axis when the holder is in the upright orientation. The holder can thus be biased or urged to move into the upright orientation by the gravitational force exerted on the holder.

In a further embodiment the swivel mechanism comprises a shaft extending at the swivel axis for connecting the holder to the base.

Optionally, the swivel mechanism further comprises a rotary bearing that allows for free swiveling about the swivel axis between the base and the shaft or between the shaft and the holder. The holder can be swiveled manually. In other words, there is no need for any drives to actively drive the swiveling.

In a further embodiment the holder is freely swivable relative to the base between the upright orientation and the one or more inclined orientations. Again, the holder can be swiveled manually. In other words, there is no need for any drives to actively drive the swiveling.

Alternatively, the filling station further comprises a swivel drive for driving a swiveling of the holder relative to the base between the upright orientation and the one or more inclined orientations. Hence, the swiveling can be controlled mechanically, automatically or semi-automatically.

In another embodiment the holder comprises one or more lateral supports extending parallel to a longitudinal direction of the holder for supporting the feeder unit in the one or more inclined orientations in a lateral direction perpendicular to said longitudinal direction. The one or more lateral supports can prevent that feeder unit falls off the side of the holder when the holder is positioned in the one or more inclined orientations.

Optionally, the holder comprises a rear support for supporting the feeder unit at a side of the holder that faces the base. The rear support can prevent that the feeder unit falls over onto the base. Moreover, the rear support can effectively shield the feeder unit from said base and/or the swivel mechanism between the holder and said base.

In another embodiment the filling station comprises a feeder dock for receiving the feeder unit on the holder. The feeder dock may be optimized for receiving a feeder unit in the same way or substantially the same way in which the feeder unit is received in the automated dispensing device of the prior art. The feeder dock may form an integral part of the holder, or it may be connected thereto. The feeder dock may be detachable from the holder to be replaced by another feeder dock suitable for use with another type of feeder unit. Hence, the filling station can be adapted to work with different feeder units without modifying the holder.

Optionally, the feeder dock comprises one or more positioning members for aligning the feeder unit on the feeder dock. The one or more positioning members can improve the positioning of the feeder unit relative to the feeder dock.

Optionally, the filling station comprises a weighing element for weighing the feeder unit. The weighing element may for example be used to determine the weight of the feeder unit prior to, during and after filling. The weight difference can be used as an indication of the amount of discrete medicaments that have been loaded into the feeder unit. The weighing element may be provided in the feeder dock, in the shaft, in the base or in any other suitable position in the filling station onto which a force is transmitted that is directly or indirectly indicative of the weight of the feeder unit.

In a further embodiment the filling station comprises a first inclination stopper for limiting the swiveling of the holder in a first swivel direction to a first inclined orientation of the one or more inclined orientations. The first inclination stopper can prevent that the holder moves beyond the first inclined orientation in the first swivel direction. Such movement could potentially cause the discrete medicaments to fall out of the feeder unit. By having the first inclination stopper, the operator can simply swivel the holder towards the first inclined orientation until it cannot be swiveled any further and trust that the feeder unit is correctly positioned.

Optionally, the filling station further comprises an upright stopper for limiting the swiveling of the holder in a second swivel direction opposite to the first swivel direction to the upright orientation. Hence, it can be prevented that the holder is swiveled too far when returning the holder to the upright orientation. By having the upright stopper, the operator can simply swivel the holder towards the upright orientation until it cannot be swiveled any further and trust that the feeder unit is correctly positioned.

In a further embodiment the filling station further comprises a second inclination stopper for limiting the swiveling of the holder in a second swivel direction opposite the first swivel direction to a second inclined orientation of the one or more inclined orientations. The two inclined orientations may be on the same side of the upright orientation, for example at different inclination angles, or at opposite sides of the upright orientation. The operator can choose between the available inclined orientations depending on various factors, such as available surrounding space, holder configuration, personal preference, handedness of the operator, etc.

In a further embodiment the filling station comprises one or more stoppers which are configured for limiting the swiveling of the holder relative to the base by physically blocking the swiveling of the holder relative to the base or by magnetically retaining said holder relative to the base. While the physical block can provide a more secure hold of the holder in one of the orientations, the magnetic retaining can provide more ease of use to the operator. In particular, the operator can align the holder magnetically in the correct orientation and move said holder through a magnetically defined orientation by providing a manual force exceeding the magnetic force.

In a further embodiment the filling station comprises one or more release members which are movable between a blocking state and a release state for blocking the holder in and releasing the holder from one of the upright orientation and the one or more inclined orientations. In particular, said one or more release members can be moved out of the way of the holder such that the holder can be moved to any one of the available inclined orientations, through any intermediate orientations defined by said one or more release members. Optionally, the one or more release members can be one or more moveable pins, engaging features and/or projections, which could be biased.

In another embodiment the holder is swivable between a first inclined orientation and a second inclined orientation of the one or more inclined orientations on opposite sides of the upright orientation. The operator can choose between the available inclined orientations depending on various factors, such as available surrounding space, holder configuration, personal preference, handedness of the operator, etc.

In another embodiment the holder comprises one or more abutment members, wherein the filling station comprises one or more stoppers which are arranged in a fixed position relative to the base to contact the one or more abutment members when the holder is in the upright orientation and the one or more inclined orientations. It is convenient to have the one or more abutments members on or associated with the holder, because the holder is part of the filling station. Hence, the feeder dock and the feeder unit do not have to be modified for use with said one or more stoppers.

According to a second aspect, a method is provided for filling a feeder unit with discrete medicaments with the use of the filling station according to any one of the embodiments of the first aspect, wherein the method comprises the step of:

filling the feeder unit with the discrete medicaments when the feeder unit is held by the holder in one of the one or more inclined orientations.

The method relates to the practical implementation of the filling station according to the first aspect and thus has the same technical advantages, which will not be repeated hereafter.

In one embodiment of the method the filling station comprises a swivel mechanism for swiveling the holder relative to the base between an upright orientation and the one or more inclined orientations, wherein the method further comprises the steps of:

placing the feeder unit on the holder when said holder is in the upright orientation; and swiveling the holder and the feeder unit placed thereon from the upright orientation to one of the one or more inclined orientations.

In another embodiment the method comprises the steps of:

swiveling the holder to a first inclined orientation of the one or more inclined orientations;

swiveling the holder to a second inclined orientation of the one or more inclined orientations on opposite side of the upright orientation with respect to the first inclined orientation.

In one embodiment the holder is moved manually between the upright orientation and the one or more inclined orientations.

Alternatively, the filling station is configured for driving the swiveling of the holder between the upright orientation and the one or more inclined orientations.

Optionally, the method further comprises the step of:

weighing the feeder unit when it is positioned on the holder.

Optionally, the method further comprises the step of:

identifying the feeder unit when it is positioned on the holder. In this way it can be ensured that the correct feeder unit is being filled The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

FIG. 8 shows an isometric view of a further alternative filling station according to a fourth embodiment.

DETAILED DESCRIPTION OF THE INVENTION

FIGS. 1-5 show a feeder unit 8 and a filling station 1 for filling said feeder unit 8 with discrete medicaments, discrete solid medicaments, pharmaceuticals or solid items, articles or substances for medical use, e.g. pills, tablets, capsules or the like. The medicaments are 'discrete' in the sense that they can be dispensed one-by-one, individually, separately or in dose units. The feeder unit 8 is also known as a 'canister' or a 'medication dispensing unit container'. The feeder unit 8 is part of a large number of feeder units (not shown) to be installed in an array of feeder positions of an automated dispensing device.

Figure 1:
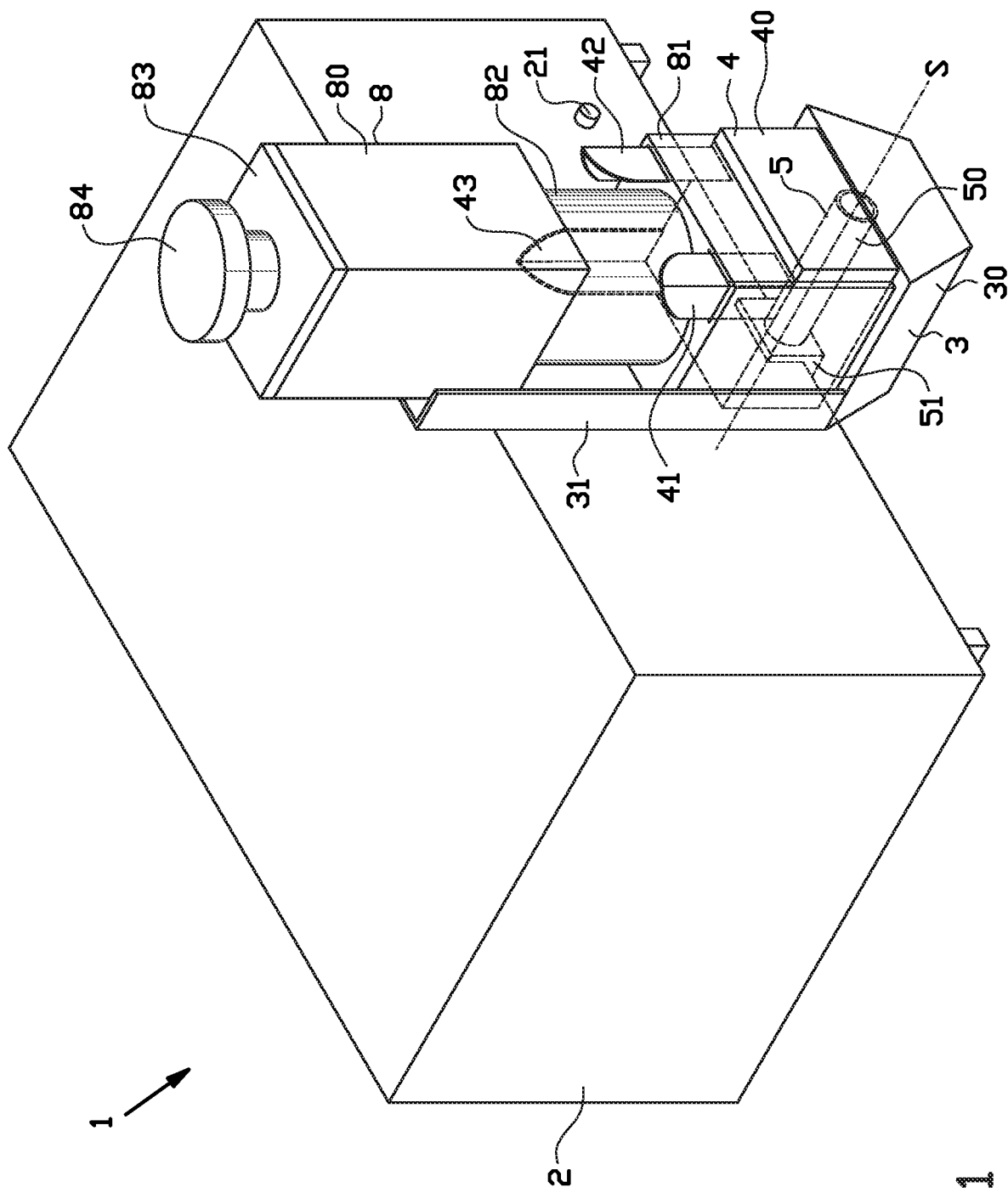
FIG. 1 shows an isometric view of a filling station according to a first embodiment for filling a feeder unit with discrete medicaments.
Figure 2:
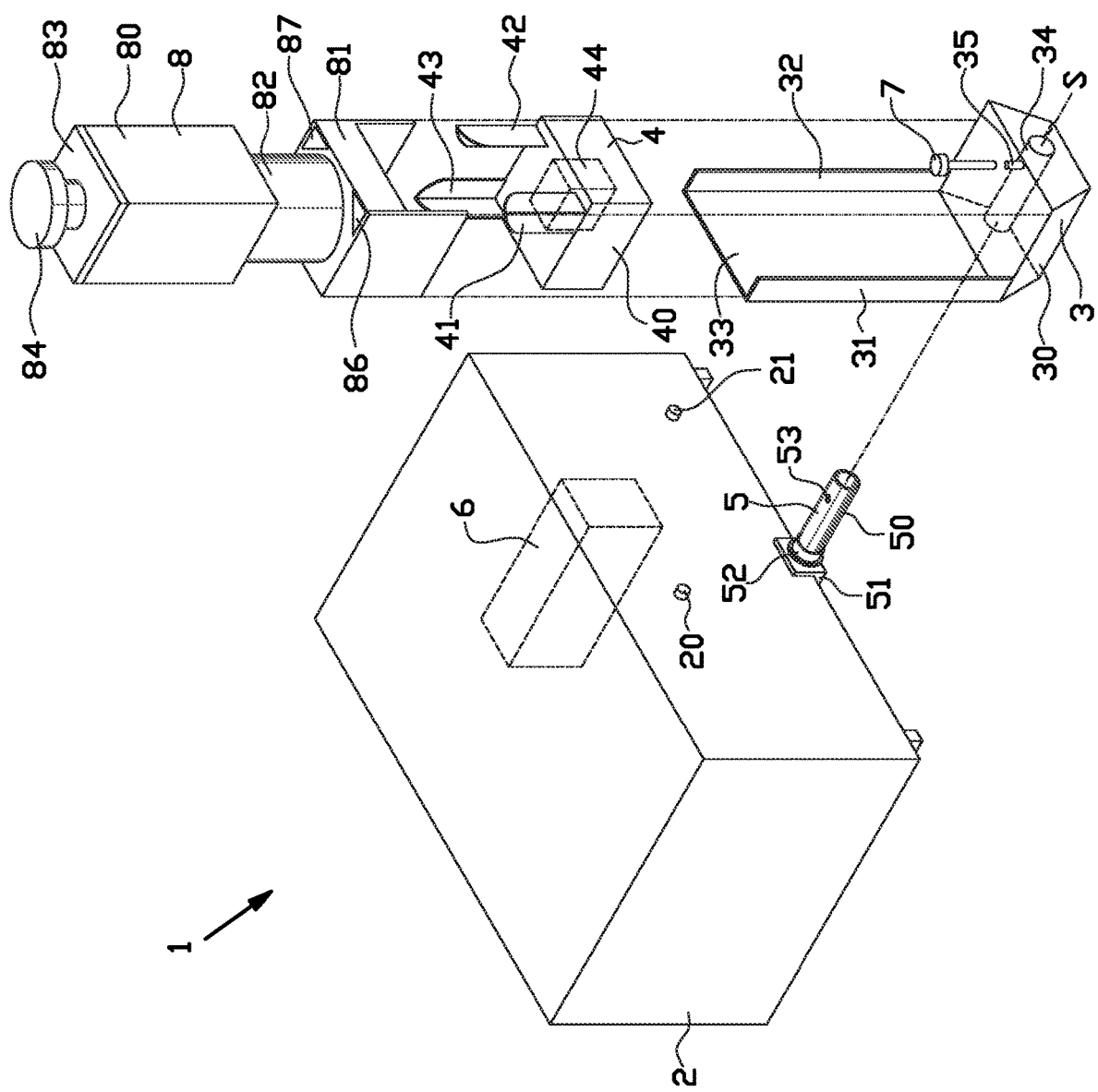
FIG. 2 shows an exploded view of the filling station according to FIG. 1.
Figure 3:
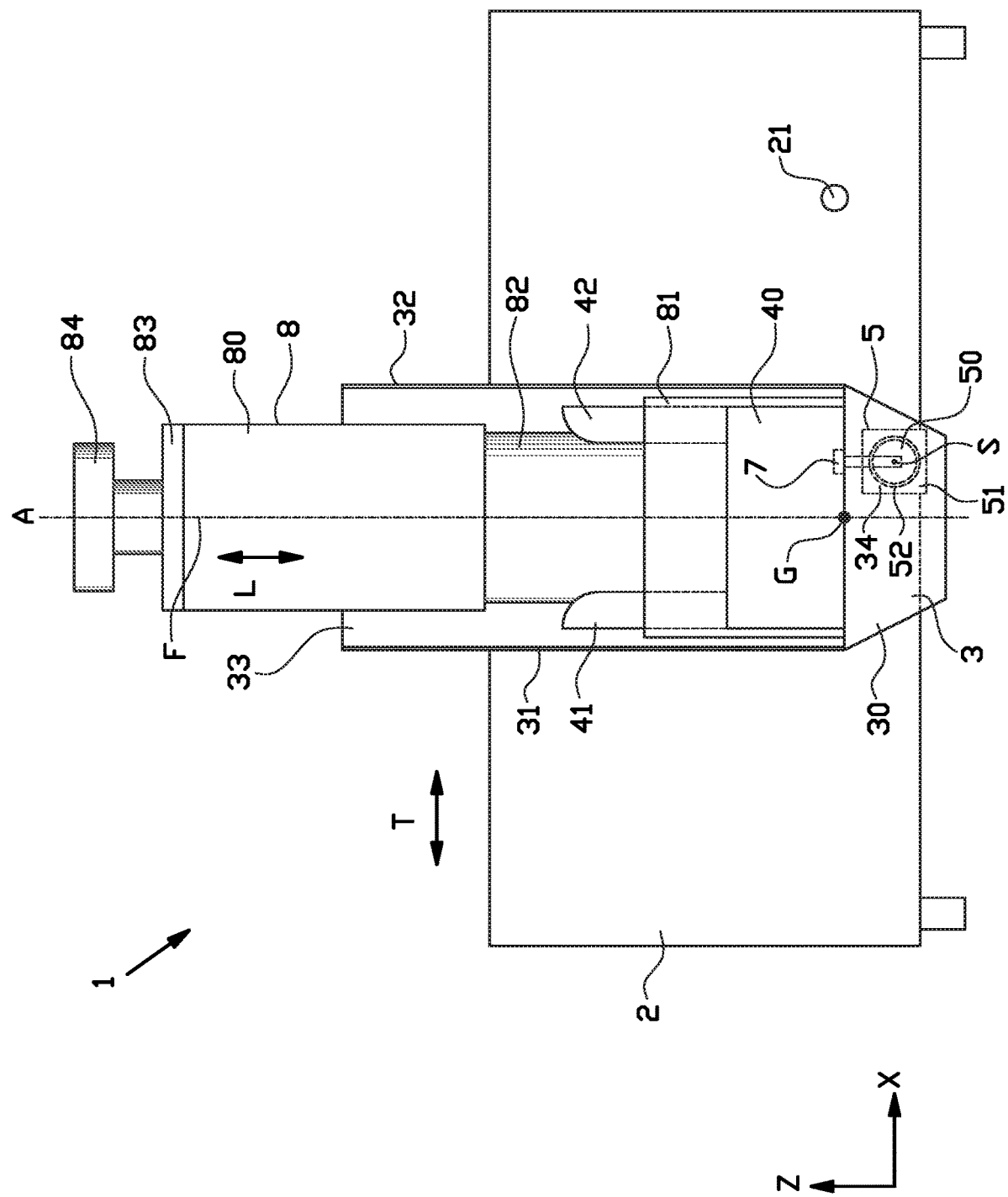
FIG. 3 shows a front view of the filling station according to FIG. 1 with the feeder unit in an upright orientation.
Figure 4:
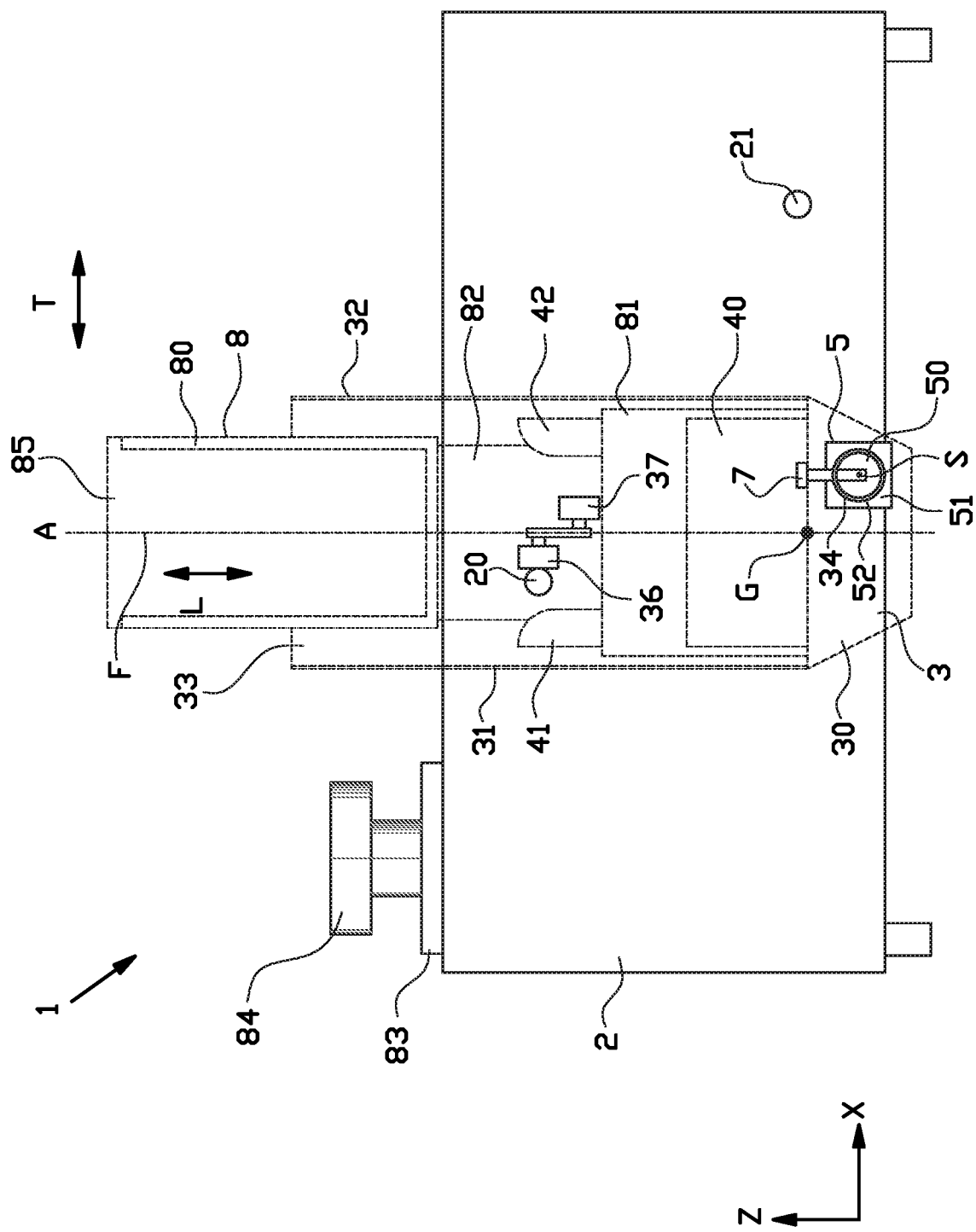
FIG. 4 shows a front view of the filling station according to FIG. 1 with parts of the feeder unit and the filling station shown in dashed lines.
Figure 5:
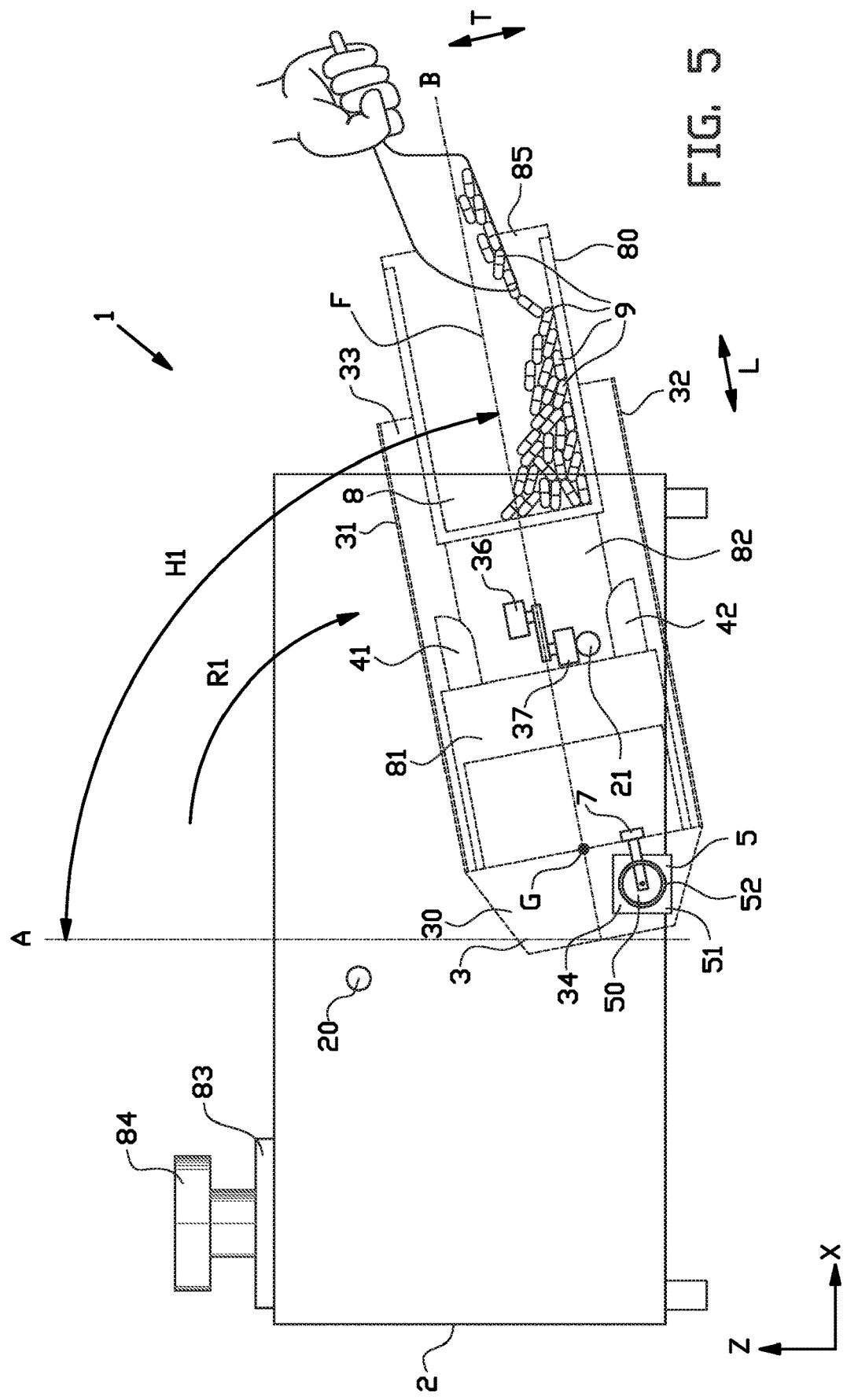
FIG. 5 shows a front view similar to FIG. 4, with the feeder unit swivelled into a first inclined orientation.

As shown in FIG. 2, the feeder unit 8 comprises a supply chamber 80 that defines a volume for receiving the discrete medicaments, a dispensing section 81 for selectively dispensing the discrete medicaments from the feeder unit 8 and a singulating section 82 between the supply chamber 80 and the dispensing section 81 for separating or singulating the discrete medicaments such that they can be fed into the dispensing section 81 one by one. The supply chamber 80 is closed at the top by a lid or a cover 83 that may be hingedly connected to the supply chamber 80 or removable in its entirety from said supply chamber 80. In this example, the cover 83 is provided with a knob 84 to facilitate manual opening or removal of said cover 83. As shown in FIGS. 4 and 5, the cover 83, when opened or removed, exposes a filling opening 85 that directly communicates with the supply chamber As shown in FIG. 3, the feeder unit 8 has a feeder plane F extending longitudinally through the feeder unit 8 from the knob 84 at the top to the dispensing section 81 at the bottom. In this example, the feeder unit 8 is substantially symmetrical about said feeder plane F. The feeder plane F can also be considered as a mid-plane or a sagittal plane.

As best seen in FIG. 2, the feeder unit 8 is provided with a plurality of positioning slots 86, 87 that can be mated with corresponding positioning members at the array of feeder positions in the automated dispensing device for accurate positioning and/or alignment of said feeder unit 8. The feeder unit 8 can be positioned and/or aligned in the same way or a similar way with the feeder dock 4 of the filling station 1 in a manner that will be described hereafter in more detail.

As shown in FIG. 2, the filling station 1 comprises a base 2 and a holder 3 for holding the feeder unit 8 relative to the base 2. In this example, the filling station 1 further comprises a feeder dock 4 for receiving the feeder unit 8 on the holder 3.

As shown in FIG. 3, the holder 3 comprises a platform 30 for receiving, supporting and/or carrying the feeder dock 4 and any feeder unit 8 placed thereon. The holder 3 has a generally elongated shape, extending in a longitudinal direction L for receiving the feeder unit 8 in an orientation in which the feeder plane F is parallel or substantially parallel to said longitudinal direction L.

The holder 3 is further provided with a first lateral support 31 and a second lateral support 32 standing up or protruding from the platform 30. The lateral supports 31, 32 extend parallel or substantially parallel to said longitudinal direction L. In this example, the lateral supports 31, 32 can provide support to the feeder unit 8 in a lateral direction T perpendicular to said longitudinal direction L. In this example, the lateral supports 31, 32 are formed as side walls or flanges extending alongside and on opposite sides of at least a part of the feeder unit 8. The holder 3 further has a rear support 33 that shields the feeder unit 8 at the rear side of the holder 3 that faces the base 2. In this example, the rear support 33 interconnects the lateral supports 31, 32. The lateral supports 31, 32 and the rear support 33 together form a partial enclosure in which the feeder unit 8 can be received.

As best seen in FIG. 2, the feeder dock 4 comprises a dock body 40 and a plurality of positioning members 41-43 standing up or protruding from said dock body 40. When aligned with the holder 3, the positioning members 41-43 extend parallel or substantially parallel to the longitudinal direction L of said holder 3. The previously described positioning slots 86, 87 of the feeder unit 8 can be slid over the respective positioning members 41-43 to align and/or position the feeder unit 8 accurately on the feeder dock 4. The feeder dock 4 may be fixedly connected to the holder 3, integral with said holder 3, or in this case detachable from said holder 3. The feeder dock 4 may be exchanged with another feeder dock 4 depending on the type of feeder unit 8 that is being used. For example, the number or shape of the positioning members 41-43 may be different for different feeder docks 4.

Optionally, the filling station 1 is provided with a weighing element 44 for weighing the feeder unit 8. The weighing element 44 can be used to determine the weight of the feeder unit 8 prior to, during and after filling. In this example, the weighing element 44 is provided in the feeder dock 4. Alternatively, the weighing element may be provided in any other suitable position in the filling station 1 onto which a force is transmitted that is directly or indirectly indicative of the weight of the feeder unit 8.

As shown in FIG. 4, the holder 3 is positionable in an upright orientation A. In said upright orientation A, the longitudinal direction L of the holder 3, and consequently the feeder plane F of the feeder unit 8 supported thereon, is parallel or substantially parallel to a vertical plane Z. Alternatively, the upright orientation A may be slightly offset with respect to the vertical plane Z, for example over an offset angle of less than five degrees (not shown), to bias the holder 3 towards said upright orientation A under the influence of gravity. The holder 3 is movable, rotatable, pivotable, tiltable or swivable from the upright orientation A, as shown in FIG. 4, towards and/or into a first inclined orientation B, as shown in FIG. 5. In the first inclined orientation B, the longitudinal direction L of the holder 3, and consequently the feeder plane F, extends at a first inclination angle H1 of at least forty-five degrees to the vertical plane Z.

In this example, the filling station 1 comprises a swivel mechanism 5 for swiveling the holder 3 relative to the base 2 between the upright orientation A and the first inclined orientations B. In particular, the swivel mechanism 5 defines a swivel axis S and guides the holder 3 in a swiveling motion about said swivel axis S relative to the base 2. The swivel axis S extends parallel to a horizontal plane X and/or the feeder plane F. In this example, the swivel mechanism 3

As best seen in FIG. 2, in this example, the swivel mechanism 5 comprises a shaft 50 extending at or coinciding with the swivel axis S. The shaft 50 connects the holder 3 to the base 2. The holder 3 is provided with a bore or a shaft hole 34 for receiving the shaft 50. The shaft 50 is mounted via a shaft holder 51 to base 2 in a position in which the shaft 50 protrudes from the base 2 towards the holder 3. Optionally, the swivel mechanism 5 further includes a rotary bearing 52 between the shaft holder 51 and the shaft 50 to facilitate free rotation of the shaft 50 relative to the shaft holder 51. The holder 3 is provided with a key mounting hole 35 and the shaft 53 is provided with a keyway 53 which, when aligned with the key mounting hole 35, is able to receive a key 7 that rotationally fixes the holder 3 to the shaft 50. Alternatively, the shaft 50 may be fixed against rotation relative to the base 2 and further rotary bearings (not shown) may be provided between the holder 3 and the shaft 50 to allow for free rotation of the holder 3 relative to the shaft 50.

Other swivel mechanisms 5 may be envisioned, such as linkages, cam slots or the like, that can provide the same or a similar swiveling movement of the holder 3 relative to the base 3. The swiveling movement is not limited to a movement about a single swivel axis S, it may also include more complex motion paths.

As shown in FIG. 4, the holder 3 has a center of gravity G that is located at one side of the swivel axis S in a lateral direction L perpendicular to said swivel axis S when the holder 3 is in the upright orientation A. The holder 3 can thus be biased or urged to move or stay into the upright orientation A by the weight or the gravitational force that is exerted onto the holder 3.

The holder 3 is freely movable in a first swivel direction R1 from the upright orientation A, as shown in FIG. 4, and the first inclined orientation B, as shown in FIG. 5. The holder 3 can be moved manually, that is without the use of tools. The holder 3 can be freely returned in a second swivel direction R2 opposite to the first swivel direction R1. To limit the swiveling of the holder 3 between the upright orientation A, as shown in FIG. 4, and the first inclined orientation B, as shown in FIG. 5, the holder 3 is further provided with a first abutment member 36 and a second abutment member 37. In this example, the abutment members 36, 37 are positioned at the rear of the holder 3, more specifically at the side of the rear support 33 facing the base 2. The abutment members 36, 37 can be provided with elastic material, such as rubber, to absorb the impact of the holder 3 when reaching the respective orientations A, B. The base 2 is correspondingly provided with an upright stopper 20 and a first inclination stopper 21 which are in the path of the first abutment member 36 and the second abutment member 37, respectively, during the swivelling. In particular, the first inclination stopper 21 is strategically positioned on the base 2 to come into physical abutment with the second abutment member 37 when the holder 3 reaches the first inclined orientation B. Similarly, the upright stopper 20 is strategically positioned on the base 2 to come into abutment or contact with the first abutment member 36 when the holder 3 reaches the upright orientation A.

Alternatively, the stoppers may be provided in the form of latching elements, such as movable pins, protrusions, projections or other engaging features, which can be biased to engage a corresponding receiving feature in the holder 3. The latching elements may also be provided on the holder 3 and be biased towards corresponding receiving features in the base 2.

The stoppers 20, 21 may be in a fixed position on the base 2. Alternatively, their respective positions on the base 2 may be manually or mechanically adjustable, for example by providing multiple mounting holes or by mechanically adjusting their respective positions, to adjust the first inclination angle H1, the first inclined orientation B and/or the upright orientation A.

The method for filling the feeder unit 8 with the use of the aforementioned filling station 1 will now be briefly elucidated with reference to FIGS. 3, 4 and 5.

FIG. 3 shows the situation in which the feeder unit 8 is placed on the feeder dock 4. The holder 3 is in the upright orientation A. FIG. 4 shows that the cover 83 has been removed from the feeder unit 8. In case of a hinged cover, the cover is tilted into the open position. The filling opening 85 is now exposed. FIG. 5 shows the situation in which the holder 3, and the feeder unit 8 supported thereon, has been swivelled from the upright orientation A into the first inclined orientation B. The filling station 1 can autonomously hold the feeder unit 8 in the first inclined orientation B, so that the operator has both hands free to perform the filling. The discrete medicaments 9 may now be loaded into the supply chamber 80 via the filling opening 85.

The supply chamber 80 is conveniently positioned at an angle to the vertical plane Z. In particular, the internal circumferential surface or side wall of the supply chamber 80 is arranged at a relatively shallow angle to the horizontal plane X. Hence, the discrete medicaments 9 can be loaded in such a way that they can be deflected via or slide over the side wall of the supply chamber 80 towards the bottom end of said supply chamber 80, instead of falling directly onto said bottom end. The risk of damage to the discrete medicaments 9 can thus be minimized or reduced. While FIG. 5 shows manual filling, the filling could be performed by a machine, robot or other manner than hand-filling.

Figure 6:
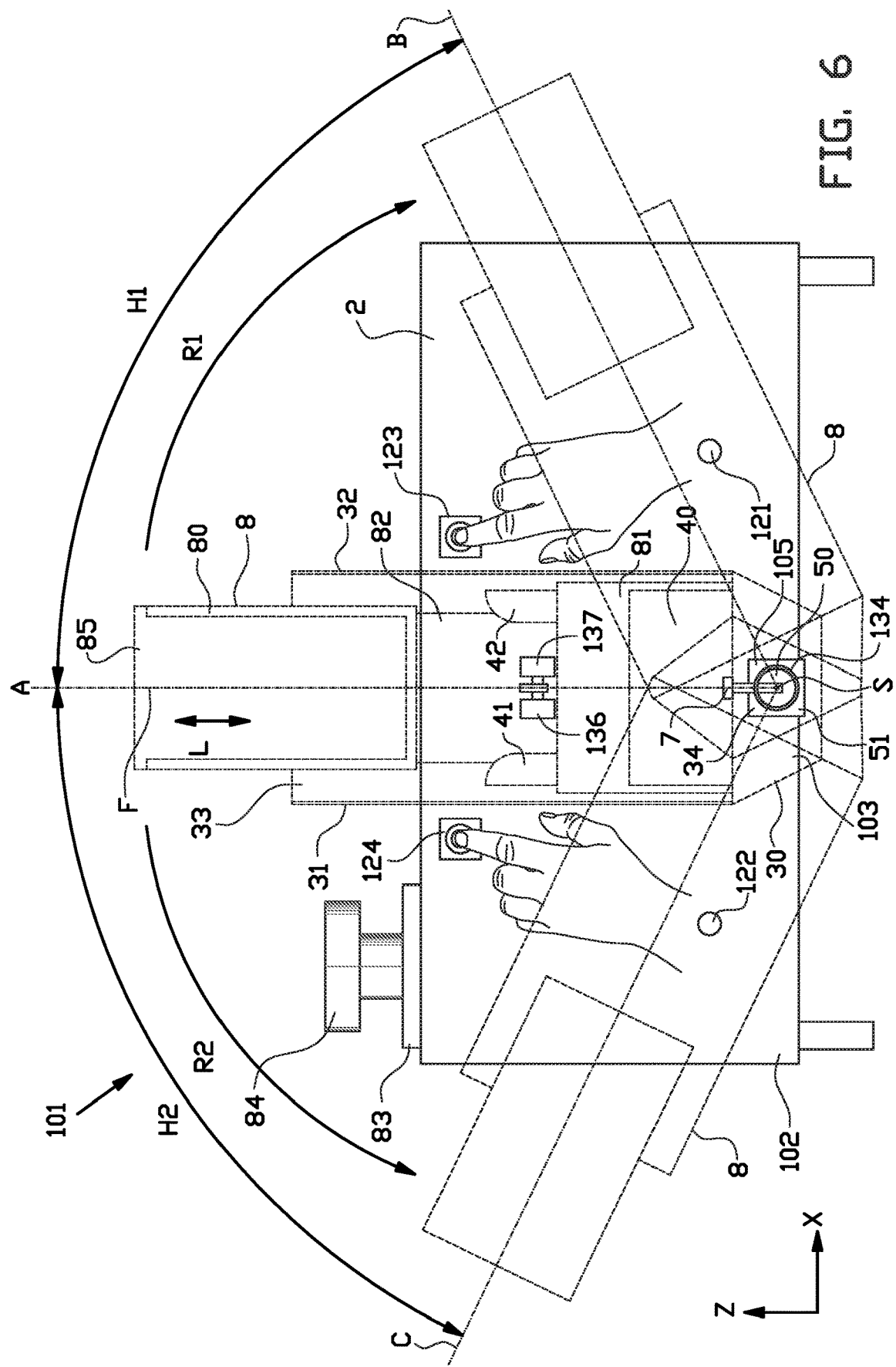
FIG. 6 shows a front view of an alternative filling station according to a second embodiment, which allows for swivelling of the feeder unit from the upright orientation into two oppositely inclined orientations.

FIG. 6 shows an alternative filling station 101 according to a second embodiment, which differs from the previously discussed filling station 1 in that the holder 103 is swivable between the first inclined orientation B and a second inclined orientation C on an opposite side of the upright orientation A relative to the first inclined orientation B. In particular, the alternative filling station 101 comprises a first inclination stopper 121 in a similar position as the first inclination stopper 21 of the previous embodiment, and a second inclination stopper 122 for limiting the swiveling of the holder 103 in a second swivel direction R2 opposite to the first swivel direction R1 to the second inclined orientation C. The operator can choose between the available inclined orientations B, C depending on personal preference, such as the handedness of the operator, accessibility of the medicaments for filling, etc.

The abutment members 136, 137 may be slightly modified to take into account the positions of the first inclination stopper 121 and the second inclination stopper 122.

In this example, the swivel mechanism 105 is adjusted accordingly such that the swivel axis S is located closer to or in the symmetrical mid-plane of the holder 103, for example coinciding with the feeder plane F. In particular, the position of the shaft opening 134 is closer a center position with the holder 103. This allows for a more symmetrical swiveling in both swivel directions R1, R2.

As shown in FIG. 6, the alternative filling station 101 further comprises two release members 123, 124, one on each side of the holder 103 when said holder 103 is in the upright orientation A. The release members 123, 124 can be provided in the form of the aforementioned latching members, such as moveable pins, protrusions, projections or other types of engaging features, which may be biased. In particular, the release members 123, 124 are movable between a blocking state and a release state for blocking the holder 103 in the upright orientation A and releasing the holder 103 from said upright orientation A, respectively. In this example, the release member 123, 124 can be pushed manually into a recessed position behind the rear support 33 to release the holder 103. The release members 123, 124 may be biased to return to their original extended position when the holder 103 has passed a respective one of the release members 123, 124 in one of the swivel direction R1, R2. The release members 123, 124 can be pushed in a similar manner to allow return of the holder 103 to the upright orientation A. The release members 123, 124 can also be used in one or more of the inclined orientations B, C.

Figure 7:
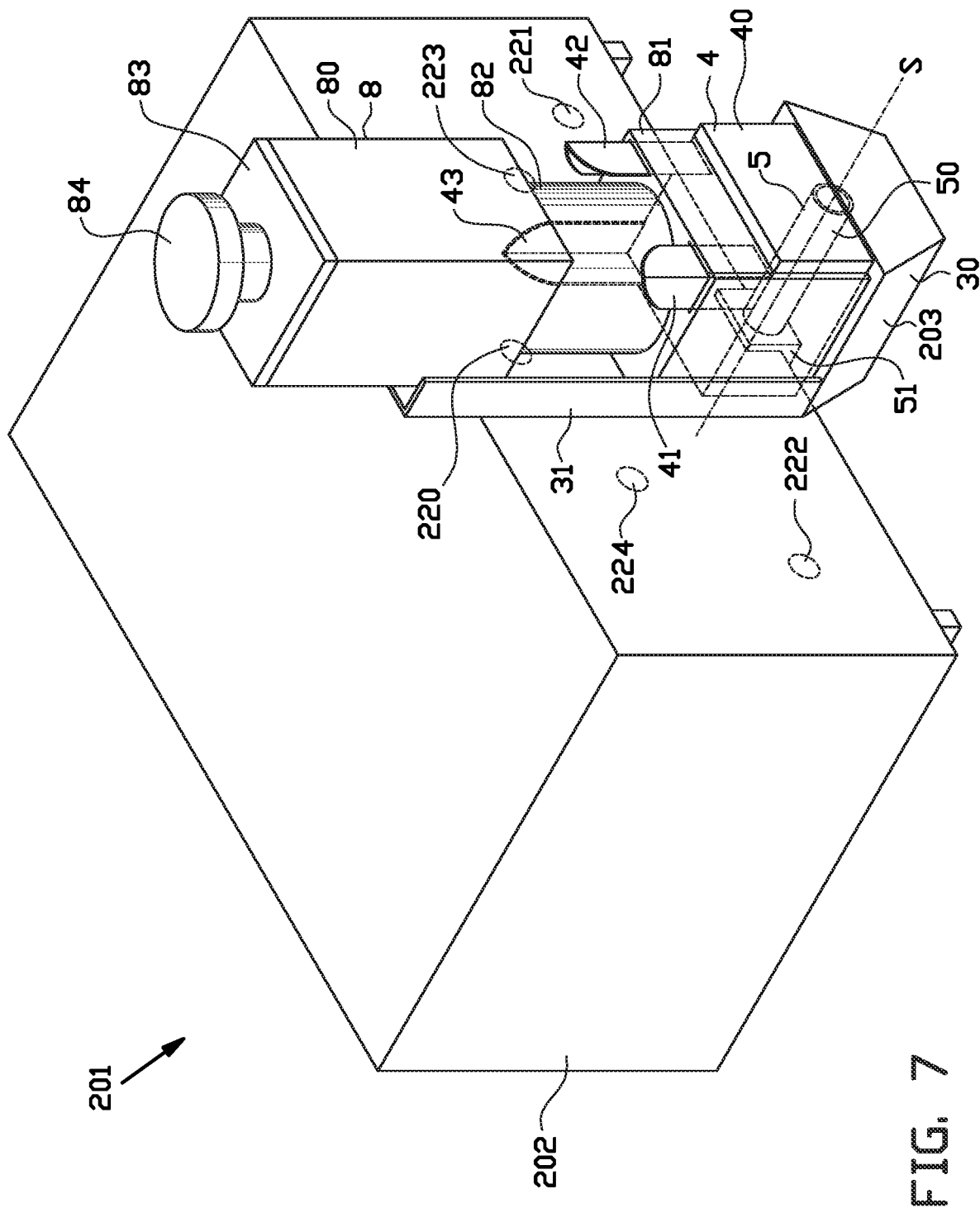
FIG. 7 shows an isometric view of a further alternative filling station according to a third embodiment.

FIG. 7 shows a further alternative filling station 201 according to a third embodiment, which differs from the previously discussed filling stations 1, 101 in that it features an upright stopper 220 and/or one or more inclination stoppers 221, 222, 223, 224 in the form of magnets. The one or more stoppers 220-224 may be provided in one of the base 202 or the holder 203, with corresponding ferromagnetic features in the other of the base 202 and the holder 203. The one or more stoppers 220-224 can be used to retain the holders 203 in one or more orientations relative to the base 202 with a magnetic force. In this embodiment, the aforementioned abutment members and/or release members are not required, but may still be provided as an additional security.

FIG. 8 shows a further alternative filling station 301 according to a fourth embodiment, which differs from the previously discussed filling stations 1, 101, 201 in that the further alternative filling station 301 further comprises a swivel drive 351, preferably housed in the base 302, for driving a swiveling of the holder relative to the base 302 between the upright orientation A and one or more inclined orientations B, C. The swivel drive 351 may be configured to drive the shaft 350 directly.

The previously discussed filling stations 1, 101, 201, 301 may optionally be provided with a control unit 6 and/or further electronics, such as sensors, RFID readers, barcode scanners, processors, memory and the like, preferably housed in the base 2, 102, 202, 302, to provide additional functionality to and/or at least partially automate the filling operation. In particular, the control unit 6 can be operationally and/or electronically connected to the feeder dock 4 to read out information from the feeder unit 8, or receive signals from the weighing element 44 indicative of the weight of the feeder unit 8 or its contents. More in particular, the filling station 1, 101, 201 may be configured to identify the feeder unit 8 that is placed on the holder 3 during the filling operation, to ensure that the correct feeder unit 8 is being filled. The control unit 6 may be loaded with computer-readable instructions that, when executed by a processor, cause the control unit 6 to calculate the amount of discrete medicaments 9 loaded into the feeder unit 8 based on the weight of the feeder unit 8 before, during and/or after the filling operation. In the embodiment as shown in FIG. 8, the control unit 6 can be operationally and/or electronically connected to the swivel drive 351 to control the position of the holder 3 relative to the base 302.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

LIST OF REFERENCE NUMERALS 1 filling station
2 base
20 upright stopper
21 first inclination stopper
3 holder
30 platform
31 first lateral support
32 second lateral support
33 rear support
34 shaft hole
35 key mounting hole
36 first abutment member
37 second abutment member
4 feeder dock
40 dock body
41 first positioning member
42 second positioning member
43 third positioning member
44 weighing element
5 swivel mechanism
50 shaft
51 shaft holder
52 rotary bearing 53 keyway
6 control unit
7 key
8 feeder unit
80 supply chamber
82 singulating section
81 dispensing section
83 cover
84 knob
85 filling opening
86 first positioning slot
87 second positioning slot
9 discrete medicament
101 alternative filling station
102 base
121 first inclination stopper
122 second inclination stopper
123 first release member
124 second release member
103 holder
134 shaft hole
136 first abutment member
137 second abutment member
105 swivel mechanism
201 further alternative filling station
202 base
220 upright stopper
221-224 inclination stoppers
301 further alternative filling station
302 base
305 swivel mechanism
350 shaft
351 swivel drive
A upright orientation
B first inclined orientation
C second inclined orientation
F longitudinal plane of the feeder unit
G center of gravity
H1 first inclination angle
H2 second inclination angle
L longitudinal direction of the holder
R1 first swivel direction
R2 second swivel direction
S swivel axis
T lateral direction
X horizontal plane
Z vertical plane

The invention claimed is:

1. A filling station for filling a feeder unit (8) from a top of the feeder unit with discrete medicaments, wherein the filling station (1, 101, 201, 301) comprises
a base (2, 102, 202, 302) and
a holder (3, 103, 203) connected to the base (2, 102, 202, 302),
a feeder dock connected to the holder for movement with the holder, the feeder dock for removably receiving the feeder unit on the holder,
wherein the holder (3, 103, 203) is positionable in one or more inclined orientations (B, C) relative to said base (2, 102, 202, 302), and
wherein the holder (3, 103, 203) comprises one or more lateral supports (31, 32) extending parallel to a longitudinal direction (L) of the holder (3) for supporting the feeder unit (8) in the one or more inclined orientations (B, C) in a lateral direction (T) perpendicular to said longitudinal direction (L).

2. The filling station (1, 101, 201, 301) according to claim 1, wherein at least one of the one or more inclined orientations (B, C) is at an inclination angle (H1, H2) of at least forty-five degrees to a vertical plane (Z).

3. The filling station (1, 101, 201, 301) according to claim 1, wherein the filling station (1, 101, 201, 301) comprises a swivel mechanism (5, 105, 305) for swiveling the holder (3, 103, 203) relative to the base (2, 102, 202, 302) between an upright orientation (A) and the one or more inclined orientations (B, C).

4. The filling station (1, 101, 201, 301) according to claim 3, wherein the upright orientation (A) is parallel to or within an offset angle of less than five degrees from a vertical plane (Z).

5. The filling station (1, 101, 201, 301) according to claim 3, wherein the swivel mechanism (5, 105, 305) defines a swivel axis(S), wherein the holder (3, 103, 203) is swivable relative to the base (2, 102, 202, 302) about said swivel axis(S).

6. The filling station (1, 101, 201, 301) according to claim 5, wherein the swivel axis(S) extends parallel to a horizontal plane (X).

7. The filling station (1, 101, 201, 301) according to claim 5, wherein the holder (3, 103, 203) has a center of gravity (G) that is located at one side of the swivel axis(S) in a lateral direction (L) perpendicular to said swivel axis(S) when the holder (3, 103, 203) is in the upright orientation (A).

8. The filling station (1, 101, 201, 301) according to claim 5, wherein the swivel mechanism (5, 105, 305) comprises a shaft (50, 350) extending at the swivel axis(S) for connecting the holder (3, 103, 203) to the base (2, 102, 202, 302).

9. The filling station (1, 101, 201) according to claim 8, wherein the swivel mechanism (5, 105) further allows for free swiveling about the swivel axis(S) between the base (2, 102, 202) and the shaft (50) or between the shaft (50) and the holder (3, 103, 203).

10. The filling station (1, 101, 201) according to claim 3, wherein the holder (3, 103, 203) is freely swivable relative to the base (2, 102, 302) between the upright orientation (A) and the one or more inclined orientations (B, C).

11. The filling station (301) according to claim 3, wherein the filling station (301) further comprises a swivel drive (351) for driving a swiveling of the holder (3, 103) relative to the base (302) between the upright orientation (A) and the one or more inclined orientations (B, C).

12. The filling station (1, 101, 201, 301) according to claim 1, wherein the holder (3, 103, 203) comprises a rear support (33) for supporting the feeder unit (8) at a side of the holder (3, 103, 203) that faces the base (2, 102, 202, 302).

13. The filling station (1, 101, 201, 301) according to claim 1, wherein the feeder dock (4) comprises one or more positioning members (41, 42, 43) for aligning the feeder unit (8) on the feeder dock (4).

14. The filling station (1, 101, 201, 301) according to claim 1, wherein the filling station (1, 101, 201, 301) comprises a weighing element (44) for weighing the feeder unit (8).

15. The filling station (1, 101, 201, 301) according to claim 3, wherein the filling station (1, 101, 201, 301) comprises a first inclination stopper (21, 121, 221) for limiting the swiveling of the holder (3, 103, 203) in a first swivel direction (R1) to a first inclined orientation (B) of the one or more inclined orientations (B, C).

16. The filling station (1, 201, 301) according to claim 15, wherein the filling station (1, 201, 301) further comprises an upright stopper (20, 220) for limiting the swiveling of the holder (3, 203) in a second swivel direction (R2) opposite to the first swivel direction (R1) to the upright orientation (A) and/or a second inclination stopper (122, 222) for limiting the swiveling of the holder (103) in a second swivel direction (R2) opposite to the first swivel direction (R1) to a second inclined orientation (C) of the one or more inclined orientations (B, C).

17. The filling station (1, 101, 201, 301) according to claim 3, wherein the filling station (1, 101, 201, 301) comprises one or more stoppers (20, 21, 121, 122, 220-224) which are configured for limiting the swiveling of the holder (3, 103, 203) relative to the base (2, 102, 202, 302) by physically blocking the swiveling of the holder (3, 103) relative to the base (2, 102, 302) or by magnetically retaining said holder (203) relative to the base (202) and/or one or more release members (123, 124) which are movable between a blocking state and a release state for blocking the holder (103) in and releasing the holder (103) from one of the upright orientation (A) and the one or more inclined orientations (B, C).

18. The filling station (101) according to claim 3, wherein the holder (103) is swivable between a first inclined orientation (B) and a second inclined orientation (C) of the one or more inclined orientations (B, C) on opposite sides of the upright orientation (A).

19. The filling station (1, 101, 201) according to claim 3, wherein the holder (3, 103) comprises one or more abutment members (36, 37, 136, 137), wherein the filling station (1, 101, 201) comprises one or more stoppers (20, 21, 121, 122) which are arranged in a fixed position relative to the base (2, 102, 202) to contact the one or more abutment members (36, 37, 136, 137) when the holder (3, 103) is in the upright orientation (A) and the one or more inclined orientations (B, C).

20. A method for filling a feeder unit (8) with discrete medicaments (9), wherein the method comprises the step of:
   placing the feeder unit in the feeder dock of the filling station (1, 101, 201, 301) according to claim 1;
   filling the feeder unit (8) with the discrete medicaments (9) when the feeder unit (8) is held by the holder (3, 103, 203) in one of the one or more inclined orientations (B, C).

21. The method according to claim 20, wherein the method further comprises the steps of:
   placing the feeder unit (8) in the feeder dock off the holder (3, 103, 203) when said holder (3, 103, 203) is in the upright orientation (A); and
   swiveling the holder (3, 103, 203) and the feeder unit (8) placed thereon from the upright orientation (A) to one of the one or more inclined orientations (B, C).

22. The method according to claim 20, wherein the method comprises the steps of:
   swiveling the holder (103, 203) to a first inclined orientation (B) of the one or more inclined orientations (B, C);
   swiveling the holder (103, 203) to a second inclined orientation (C) of the one or more inclined orientations (B, C) on a opposite side of the upright orientation (A) with respect to the first inclined orientation (B).

23. The method according to claim 20, wherein the method further comprises the step of:
   weighing the feeder unit (8) when it is positioned on the holder (3, 103) and/or
   identifying the feeder unit (8) when it is positioned on the holder (3, 103).

24. A filling station for filling a feeder unit (8) from a top of the feeder unit with discrete medicaments, wherein the filling station (1, 101, 201, 301) comprises
   a base (2, 102, 202, 302) and
   a holder (3, 103, 203) connected to the base (2, 102, 202, 302),
   a feeder dock connected to the holder for movement with the holder, the feeder dock for removably receiving the feeder unit on the holder,
   a swivel mechanism (5, 105, 305) for swiveling the holder (3, 103, 203) relative to the base (2, 102, 202, 302) about a swivel axis(S) between an upright orientation (A) and one or more inclined orientations (B, C)
   wherein the holder (3, 103, 203) is positionable in one or more inclined orientations (B, C) relative to said base (2, 102, 202, 302), and
   wherein the holder (3, 103, 203) has a center of gravity (G) that is located at one side of the swivel axis(S) in a lateral direction (L) perpendicular to said swivel axis(S) when the holder (3, 103, 203) is in the upright orientation (A).

25. The filling station according to claim 24, wherein at least one of the one or more inclined orientations (B, C) is at an inclination angle (H1, H2) of at least forty-five degrees to a vertical plane (Z).

26. The filling station according to claim 24, wherein the swivel mechanism comprises a shaft extending at the swivel axis(S) for connecting the holder to the base.

27. The filling station according to claim 24, and further comprising a swivel drive for driving a swiveling of the holder relative to the base between the upright orientation (A) and the one or more inclined orientations (B, C).

28. The filling station according to claim 24, wherein the feeder dock comprises one or more positioning members for aligning the feeder unit on the feeder dock and/or a weighing element for weighing the feeder unit.

29. The filling station according to claim 24, wherein the filling station (1, 101, 201, 301) comprises a one or more stoppers for limiting the swiveling of the holder.

* * * * *